C. H. DOUGLAS.
DRIVING CHAIN FOR TRANSMITTING POWER.
APPLICATION FILED NOV. 15, 1913.
1,141,869.
Patented June 1, 1915.
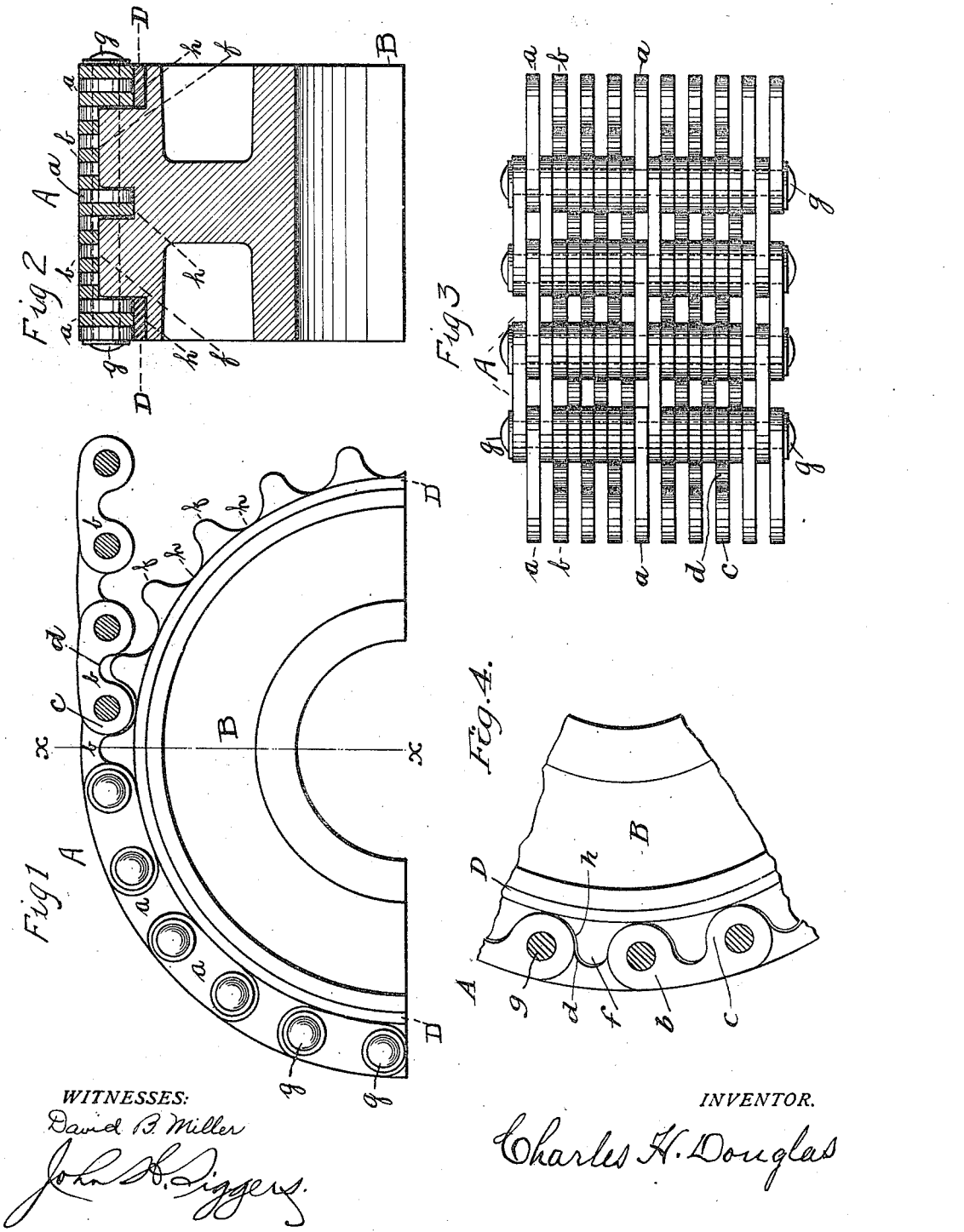
WITNESSES:
David B. Miller
John H. Diggers
INVENTOR.
Charles H. Douglas

UNITED STATES PATENT OFFICE.

CHARLES H. DOUGLAS, OF SPRINGFIELD, MASSACHUSETTS, ASSIGNOR TO DOUGLAS SAW & MACHINERY CO., OF BOSTON, MASSACHUSETTS.

DRIVING-CHAIN FOR TRANSMITTING POWER.

1,141,869. Specification of Letters Patent. Patented June 1, 1915.

Application filed November 15, 1913. Serial No. 801,182.

*To all whom it may concern:*

Be it known that I, CHARLES H. DOUGLAS, a citizen of the United States, residing at Springfield, in the county of Hampden and State of Massachusetts, have invented certain new and useful Improvements in Driving-Chains for Transmitting Power, of which the following is a specification.

This invention has reference to improvements in driving chains for transmitting power and particularly in driving chains of the silent type.

The object of the present invention is to produce a driving chain that will run silently at a much higher linear speed than driving chains now in use, and the chain of the present invention is designed particularly for driving circular saws for cutting timber.

Heretofore driving chains have been proposed for use in connection with gear wheels to provide a non-slipping positive drive not at all dependent upon friction, but such driving chains because of their construction are silent only at relatively low linear speeds, say, from seven hundred to a thousand feet per minute, but when relatively high speeds, say, two thousand or more feet per minute, are demanded, as in the case of circular saws, the noise produced is obtrusive, this being due to the rapid impact of the links of the chain with the gear wheel thus subjecting the chain to a great multitude of shocks which in a comparatively short time act destructively upon the chain.

In accordance with the present invention the chain is so made that it engages the gear wheel without shock and the links make contact with the teeth of the gear wheel by a rolling action which may be in some measure a sliding action. Moreover, in accordance with the present invention wear in the chain is readily compensated for so that in the event of the chain becoming loose with relation to the gear wheels because of wear the gear wheels themselves may be effectively enlarged to take up all wear.

The invention will be best understood from a consideration of the following detailed description, taken in connection with the accompanying drawings forming a part of this specification with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is a side elevation of a part of a gear wheel showing a portion of the improved chain applied thereto, with some parts in section. Fig. 2 is a section on the line *x—x* of Fig. 1. Fig. 3 is a plan view of a portion of the chain as seen from the face that engages the wheel. Fig. 4 is a fragmentary longitudinal section through the chain with a corresponding portion of the gear wheel in elevation.

In the drawings there is shown a chain A and a portion of a gear wheel B. The chain is made up of links *a* and other links *b*, and the links are held together by pins or rivets *g* upon which the links may rock freely, yet are arranged to fit so snugly that there is no appreciable lost motion.

The links *a* are arranged at the sides of the chain and may either be straight or nearly so, the links *a* being shown in Fig. 1 as slightly curved with their long sides concentric with the center of the wheel B, which latter may be taken as the largest wheel to which the chain is applied, and the links *a* because of their office may be termed supporting or carrying links for the chain, as will hereinafter appear. In chains of medium width there is provided a series of links *a* at the margins or edges only, while in the wider form of chains an intermediate series of links *a* may be employed. The other links *b* of the chain are shown as each provided with rounded ends *c* concentric with the longitudinal axis of the respective pins or rivets *g* and in one long edge of each link *b* there is formed a recess *d* intermediate of the rounded ends *c*.

The gear wheel B is formed with teeth or cogs *f* spaced apart in conformity with the recesses *d* of the connected links *b*, and between these teeth are throats rounded in conformity with the rounded ends *c* of the links *b*. The wheel B is formed at the sides with circumferential smooth ledges or shoulders *h* and in the case of a wide wheel with an intermediate circumferential shoulder or ledge *h*, in which case there are two circumferential rows or series of teeth *f* on opposite sides of the intermediate ledge $h$ and terminating at the outer ledges $h$. The chain, however, is of the full width of the wheel including the outer ledges $h$, while the links $b$ are confined to those portions of the chain which conform to the teeth $f$, and in the absence of the intermediate ledge $h$ the links $b$ occupy all of the width of the chain with the exception of the outer supporting links $a$.

In the event of wear of the links there are provided bushing rings D so arranged that the outer surface of each ring is of slightly greater diameter than the throat portions of the wheel B between the teeth $f$. For mechanical reasons the bushing ring D must be made of an appreciable thickness of metal, say, a quarter of an inch, more or less, while the amount of wear of the chain to be taken up may represent but a small fraction of an inch, say, a hundredth of an inch, more or less. To apply the rings D the side or marginal shoulders $h$ are appropriately reduced in diameter, and then the rings D are fitted and their external diameter is made appropriately large to compensate for the wear.

The external diameter of the shoulders or ledges $h$, or in the case of the presence of the bushing rings D, the external diameter of the latter is such at all times that when the links $a$ engage the wheel B, the links $b$ where their rounded ends $c$ would otherwise engage the wheel at the throats between the teeth $f$ and where the outer ends of the said teeth would otherwise engage the bottoms of the notches $d$, there is left a small space which may be but a small fraction of an inch, say, a hundredth of an inch, more or less, wherefore there can be no impact between the links $b$ and the bottoms of the throats between the gear teeth $f$ or between the outer ends of the latter and the bottoms of the recesses $d$, while the rounded ends of the links $b$ engage the teeth $f$ by a combined rolling and sliding action.

The links $a$ come gradually to rest upon the smooth ledges or shoulders provided for their reception, whether these ledges or shoulders be represented by the body of the wheel or by the outer surfaces of the rings D and the links $a$ if made to conform to such shoulders or ledges come to rest thereupon smoothly and gently. If the links $a$ be curved into conformity with the curvature of the smooth ledges or shoulders of the largest wheel to which the chain is applied, then when passing about a smaller wheel only the central or intermediate portions of these links engage the smooth shoulders or ledges, and any tendency to come into sudden engagement with the gear wheels and so produce a noise is minimized by the extremely small area of contact limited to substantially the center portion of the link. There is no blow or impact imparted by the links $b$ to the gear wheel, since the engagement is a sliding and rolling engagement which at no point is perpendicular to the surface engaged, and consequently no appreciable sound is produced as would be the case were the active or power links caused to make engagement with the wheel between the teeth, or the latter make engagement with the links between the rounded ends thereof. The slight spacing of the power links away from the wheel or outer edges of the teeth, which spacing is shown in Fig. 4, but is not necessarily so great as therein indicated, prevents bottoming of the links with respect to the wheel, and this is due to the presence of the inactive supporting links $a$ engaging circumferentially smooth portions of the wheel represented by the ledges $h$, or in the presence of the bushing rings D, the outer surfaces of the latter.

What is claimed is:—

1. In a power drive chain structure, the combination with a wheel having driving teeth and unyielding circumferentially smooth peripheral surfaces at the sides of the teeth, of a driving chain provided with driving links for meshing with the driving teeth of the wheel, and other links shaped to coöperate with the smooth surfaces of the gear wheel the position of the smooth surfaces with respect to the throats between the teeth and the relation of the second-named links to the first-named links and to the smooth surfaces being such as to hold the driving links from bottoming engagement with the throats between the teeth.

2. A chain drive comprising a gear wheel having rigid or unyielding shoulders or ledges at the sides of the teeth, and a chain having links with ends shaped to engage the faces of the teeth and intermediate recesses shaped to receive the teeth, and other links having edge portions adapted to ride on the shoulders or ledges at the sides of the teeth, the diameter of the shoulders or ledges with respect to the throats between the teeth and the radial position of the second-named links with respect to the first-named links being such as to hold the first-named links from bottoming engagement with the throats between the teeth and the outer ends of the teeth from bottoming in the recesses of said links.

3. In a chain drive, the combination of a chain composed of active or power links and other supporting links for the power links, and a gear wheel having teeth for engaging the power links and provided with rigid or unyielding means for the supporting links constructed and arranged with respect to said supporting links so as to prevent the power links from forcibly striking the gear wheel between the teeth thereof.

4. In a chain drive, the combination with a chain composed of active or power links and other links constituting supporting links for the power links, of a gear wheel having teeth for engaging the power links, and ledges for engagement by the supporting links, said ledges being in the form of rigid or unyielding rings applied to the gear wheel, and removable therefrom to give place to like rings of greater external diameter to compensate for stretch of the drive chain, and said ledges and supporting links being related to prevent the power links from forcibly striking the gear wheel between the teeth thereof.

5. In a chain drive, a chain composed of active or power links and other links constituting supporting links for the power links, and a gear wheel having teeth for engaging the power links and rigid or unyielding peripheral ledges for receiving the supporting links, the ledges being of greater radial distance from the axis of the gear wheel than the bottoms of the throats between the teeth of the gear wheel, whereby the supporting links prevent the power links from striking the bottoms of said throats.

In testimony whereof I have affixed my signature in presence of two witnesses.

CHARLES H. DOUGLAS.

Witnesses:
JOHN H. SIGGERS,
EDITH L. BROWN.